United States Patent
Kafuku et al.

(10) Patent No.: US 9,437,026 B2
(45) Date of Patent: Sep. 6, 2016

(54) IMAGE CREATING DEVICE, IMAGE CREATING METHOD AND RECORDING MEDIUM

(71) Applicant: CASIO COMPUTER CO., LTD., Tokyo (JP)

(72) Inventors: Shigeru Kafuku, Akishima (JP); Keisuke Shimada, Hamura (JP); Hirokiyo Kasahara, Fussa (JP); Hiroyasu Koshimizu, Toyota (JP); Takuma Funahashi, Toyota (JP); Naoya Tokuda, Toyota (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 282 days.

(21) Appl. No.: 13/849,710

(22) Filed: Mar. 25, 2013

(65) Prior Publication Data

US 2013/0251267 A1    Sep. 26, 2013

(30) Foreign Application Priority Data

Mar. 26, 2012 (JP) ................. 2012-068924

(51) Int. Cl.
*G06K 9/46* (2006.01)
*G06K 9/66* (2006.01)
*G06T 11/60* (2006.01)

(52) U.S. Cl.
CPC ..................... *G06T 11/60* (2013.01)

(58) Field of Classification Search
CPC ...................................... G06T 11/60
USPC ............................... 382/192, 195
See application file for complete search history.

(56) References Cited

U.S. PATENT DOCUMENTS 5,487,140 A * 1/1996 Toya ............................. 345/641
5,542,037 A * 7/1996 Sato et al. .................... 345/635
(Continued)

FOREIGN PATENT DOCUMENTS

CN    1094830 A    11/1994
CN    1694110 A    11/2005
(Continued)

OTHER PUBLICATIONS

Related U.S. Appl. No. 14/010,192; First Named Inventor: Shigeru Kafuku; Title: "Image Generation Apparatus, Image Generation Method, and Recording Medium", filed: Aug. 26, 2013.
(Continued)

*Primary Examiner* — Samir Ahmed
(74) *Attorney, Agent, or Firm* — Holtz, Holtz & Volek PC (57) ABSTRACT

An image creating device includes: an acquiring unit, a component creation unit, an extraction unit, a specifying unit, and an image creation unit. The acquiring unit acquires an image. The component creation unit creates a face component image related to main components of a face included in the image acquired by the acquiring unit. The extraction unit extracts feature information from the face included in the image acquired by the acquiring unit. The specifying unit specifies a hair style image, which corresponds to the feature information extracted by the extraction unit, from hair style images which show outlines of hair and are associated with feature information of faces, the feature information being recorded in a recording section. The image creation unit creates a portrait image by using the hair style image specified by the specifying unit and the face component image created by the component creation unit.

13 Claims, 7 Drawing Sheets

(56) References Cited

U.S. PATENT DOCUMENTS

| | | | | |
|---|---|---|---|---|
| 5,568,599 | A | * | 10/1996 | Yoshino et al. .............. 345/630 |
| 5,588,096 | A | * | 12/1996 | Sato et al. ................... 345/634 |
| 5,600,767 | A | * | 2/1997 | Kakiyama et al. ........... 345/629 |
| 5,611,037 | A | * | 3/1997 | Hayashi ....................... 345/442 |
| 5,644,690 | A | | 7/1997 | Yoshino et al. |
| 5,787,419 | A | | 7/1998 | Sato et al. |
| 5,808,624 | A | * | 9/1998 | Ikedo .......................... 345/630 |
| 5,818,457 | A | * | 10/1998 | Murata et al. ................ 345/629 |
| 5,987,104 | A | * | 11/1999 | Tomimori .................. 379/93.23 |
| 6,219,024 | B1 | * | 4/2001 | Murata ........................ 358/1.18 |
| 2005/0251463 | A1 | | 11/2005 | Nagai et al. |
| 2005/0264658 | A1 | | 12/2005 | Ray et al. |
| 2008/0062198 | A1 | | 3/2008 | Takahashi et al. |
| 2008/0267443 | A1 | * | 10/2008 | Aarabi ......................... 382/100 |
| 2008/0298643 | A1 | * | 12/2008 | Lawther ............ G06F 17/30256 382/118 |
| 2009/0002479 | A1 | | 1/2009 | Sangberg et al. |
| 2009/0087035 | A1 | * | 4/2009 | Wen et al. .................... 382/118 |
| 2010/0164987 | A1 | | 7/2010 | Takahashi et al. |
| 2011/0280485 | A1 | * | 11/2011 | Sairyo ......................... 382/190 |
| 2012/0299945 | A1 | * | 11/2012 | Aarabi ......................... 345/589 |
| 2012/0309520 | A1 | | 12/2012 | Evertt et al. |
| 2014/0064617 | A1 | | 3/2014 | Kafuku et al. |
| 2014/0233849 | A1 | * | 8/2014 | Weng et al. .................. 382/154 |

FOREIGN PATENT DOCUMENTS

| | | |
|---|---|---|
| CN | 101527049 A | 9/2009 |
| JP | 2004-145625 A | 5/2004 |
| JP | 2008061896 A | 3/2008 |
| JP | 4986279 B2 | 7/2012 |

OTHER PUBLICATIONS

Chinese Office Action (and English translation thereof) dated Dec. 1, 2015, issued in Chinese Application No. 201310098771.4.

Japanese Office Action (and English translation thereof) dated Feb. 2, 2016, issued in counterpart Japanese Application No. 2012-068924.

Kawade, et al., "Automatic facial caricaturing technology to realize illustrator's style of painting", Technical Report of IEICE, HIP 97-5; The Institute of Electronics, Information and Communication Engineers, vol. 97, 117, Jun. 20, 1997, pp. 33-40.

Yang, et al., "Facial Feature Extraction for HairStyle Advisor", IEICE Technical Report MVE 2010-22; The Institute of Electronics, Information and Communication Engineers, Jun. 15, 2010.

* cited by examiner

IMAGE CREATING DEVICE, IMAGE CREATING METHOD AND RECORDING MEDIUM

FIELD OF THE INVENTION

The present invention relates to an image creating device, an image creating method and a recording medium.

DESCRIPTION OF THE RELATED ART

Heretofore, there has been known a portrait creation device that creates a portrait by using feature points of face parts such as eyes, a nose, a mouth, ears, and a facial contour (Japanese Patent Laid-Open Publication No. 2004-145625).

Moreover, there has been known a game device in which characters are created by combining part objects with one another. The part objects are prepared for each of regions in advance (Japanese Patent No 4986279).

Incidentally, if the portrait is described by lines of only outline shapes of characteristic configurations of the face when creating the portrait, the portrait becomes poor in reality. Contrary to the above, if the portrait is described by lines to the extent of fine structures of the face, then a touch and texture of the portrait become so fine that unique quality of the portrait is decreased. The portrait created as described above has had such problems.

Moreover, in the case of creating the portrait by the combination of the part objects, such part objects as resemblant to actual face parts are sometimes not prepared, thus there is a case where a portrait image resemblant to an actual face cannot be created.

BRIEF SUMMARY OF THE INVENTION

It is an object of the present invention to provide an image creating device, an image creating method and a recording medium, which are capable of easily creating a portrait with more plentiful expressions.

According to a first aspect of an embodiment of the present invention, there is provided an image creating device comprising: an acquiring unit that acquires image; component creation unit that creates a face component image related to main components of a face included in the image acquired by the acquiring unit; an extraction unit that extracts feature information from the face included in the image acquired by the acquiring unit; a specifying unit that specifies a hair style image, which corresponds to the feature information extracted by the extraction unit, from hair style images which show outlines of hair and are associated with feature information of faces, the feature information being recorded in a recording section; and an image: creation unit that creates a portrait image by using the hair style image specified by the specifying unit and the face component image created by the component creation unit.

According to a second aspect of an embodiment of the present invention, there is provided an image creating method using an image creating device, the image creating method comprising: an acquiring step of acquiring an image; a component creation step of creating a face component image related to main components of a face included in the acquired image; an extraction step of extracting feature information from the face included in the acquired image; a specifying step of specifying a hair style image, which corresponds to the extracted feature information, from hair style images which show outlines of hair and are associated with feature information of faces, the feature information being recorded in a recording section; and; a creation step of creating a portrait image by using the specified hair style image and the created face component image.

According to a third aspect of an embodiment of the present invention, there is provided a recording medium that records therein a program for allowing a computer of an image forming device to function as: an acquiring unit that acquires an image; a component creation unit that creates a face component image related to main components of a face included in the image acquired by the acquiring unit; an extraction unit that extracts feature, information from the face included in the image acquired by the acquiring unit; a specifying unit that specifies a hair style image, which corresponds to the feature information extracted by the extraction unit, from hair style images which show outlines of hair and are associated with feature information of faces, the feature information being recorded in a recording section; and an image creation unit that creates a portrait image by using the hair style image specified by the specifying unit and the face component image created by the component creation unit.

DETAILED DESCRIPTION OF THE INVENTION

With regard to embodiments of the present invention, description is made below of specific aspects thereof by using the drawings. However, the scope of the invention is not limited to the illustrated examples.

Figure 1:
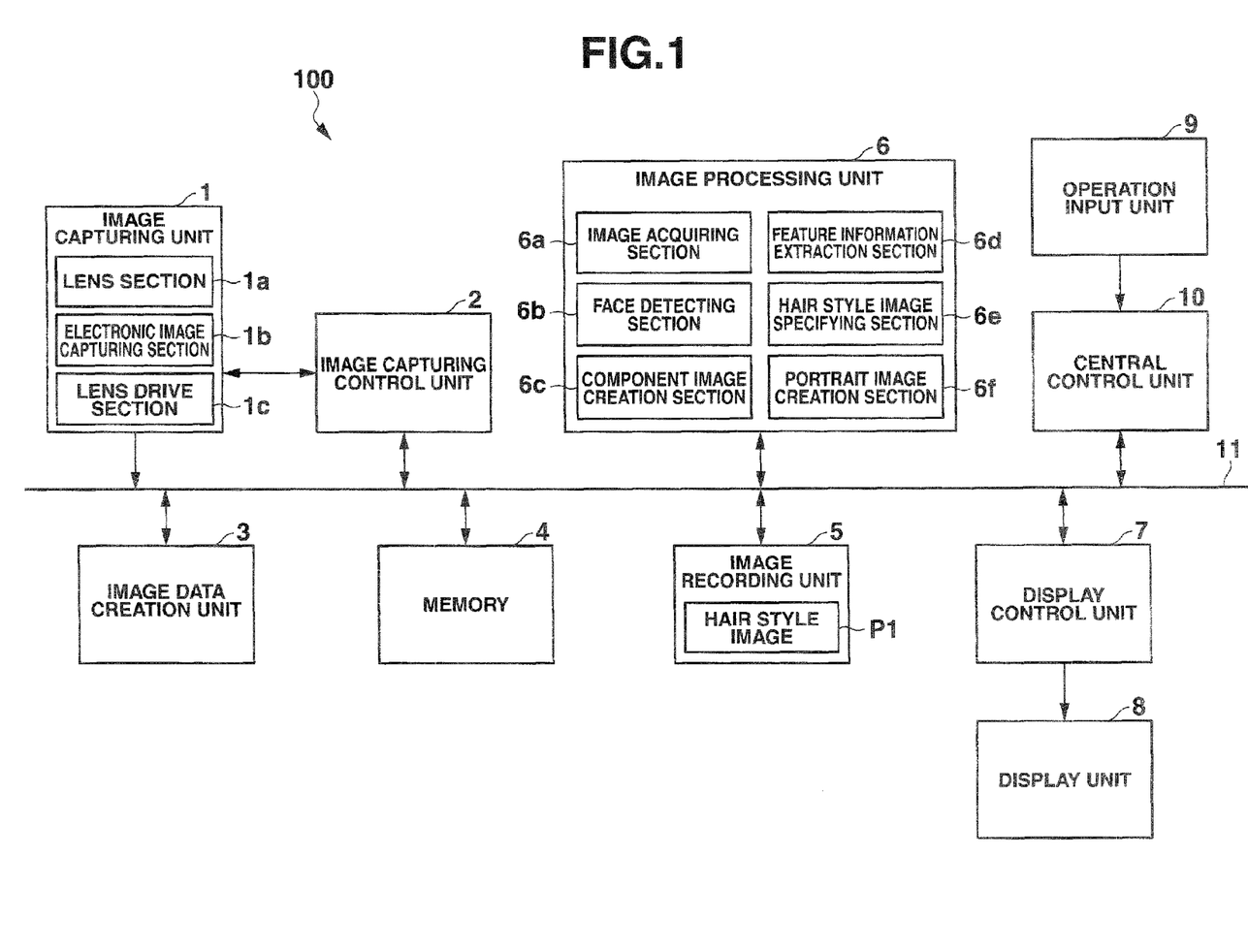
FIG. 1 is a block diagram showing a schematic configuration of an image capturing device of an embodiment to which the present invention is applied.

FIG. 1 is a block diagram showing a schematic configuration of an image capturing device 100 of an embodiment to which the present invention is applied.

As shown in FIG. 1, the image capturing device 100 of this embodiment specifically includes an image capturing unit 1, an image capturing control unit 2, an image data creation unit 3, a memory 4, an image recording unit 5, an image processing unit 6, a display control unit 7, a display unit 8, an operation input unit 9, and a central control unit 10.

Moreover, the image capturing unit 1, the image capturing control unit 2, the image data creation unit 3, the memory 4, the image recording unit 5, the image processing unit 6, the display control unit 7 and the central control unit 10 are connected to one another through a bus line 11.

As an image capturing unit, the image capturing unit 1 captures images of a predetermined subject, and creates frame images.

Specifically, the image capturing unit 1 includes a lens section 1a, an electronic image capturing section 1b, and a lens drive section 1c.

The lens section 1a is composed, for example, of a plurality of lenses such as a zoom lens and a focus lens.

The electronic image capturing section 1b is composed, for example, of an image sensor such as a charge coupled device (COD) and a complementary metal-oxide semiconductor (CMOS). The electronic image capturing section 1b converts an optical image, which has passed through a variety of the lenses of the lens section 1a, into a two-dimensional image signal.

The lens drive section 1c includes, for example, though not shown, a zoom drive unit that moves the zoom lens in an optical axis direction, a focusing drive unit that moves the focus lens in the optical axis direction, and the like.

Note that, in addition to the lens section 1a, the electronic image capturing section 1b and the lens drive section 1c, the image capturing unit 1 may include a diaphragm (not shown) that adjusts a quantity of light that passes through the lens section 1a.

The image capturing control unit 2 controls the image capturing of the subject performed by the image capturing unit 1. That is to say, though not shown, the image capturing control unit 2 includes a timing generator, a driver and the like. The image capturing control unit 2 scans and drives the electronic image capturing section 1b by the timing generator and the driver, and converts the optical image, which has passed through the lenses, into the two-dimensional image signal by the electronic image capturing section 1b in every predetermined cycle. Then, the image capturing control unit 2 reads out frame images one-by-one from an image capturing region of the electronic image capturing section 1b, and outputs the readout frame images to the image data creation unit 3.

Note that the image capturing control unit 2 may be configured to move the electronic image capturing section 1b in the optical axis direction in place of the focus lens of the lens section 1a, and may thereby adjust a focusing position of the lens section 1a.

Moreover, the image capturing control unit 2 may perform adjustment/control for image capturing conditions of the subject, such as automatic focusing processing (AF), automatic exposure processing (AE) and automatic white balance (AWB).

The image data creation unit 3 appropriately performs gain adjustment for analog-value signals of the frame images, which are transferred thereto from the electronic image capturing section 1b, for each of color components of R, G and B, thereafter, performs sample and hold for the signals concerned by a sample-and-hold circuit (not shown), and coverts the signals into digital data by an A/D converter (not shown). Then, the image data creation unit 3 performs color process treatment, which includes pixel interpolation processing and γ-correction processing, for the digital data by a color processing circuit (not shown), and thereafter, creates digital-value luminance signals Y and color-difference signals Cb and Cr (YUV data).

The luminance signals Y and the color-difference signals Cb and Cr, which are outputted from the color processing circuit, are DMA-transferred through a DMA controller (not shown) to the memory 4 for use as a buffer memory.

The memory 4 is composed, for example, of a dynamic random access memory (DRAM) or the like, and temporarily stores data and the like, which are to be processed by the image processing unit 6, the central control unit 10, and the like.

The image recording unit 5 is composed, for example, of a non-volatile memory (flash memory) and the like, and records image data to be recorded, the image data being encoded in accordance with a predetermined compression format (for example, a JPEG format and the like) by an encoding unit (not shown) of the image processing unit 6.

Figure 3A:
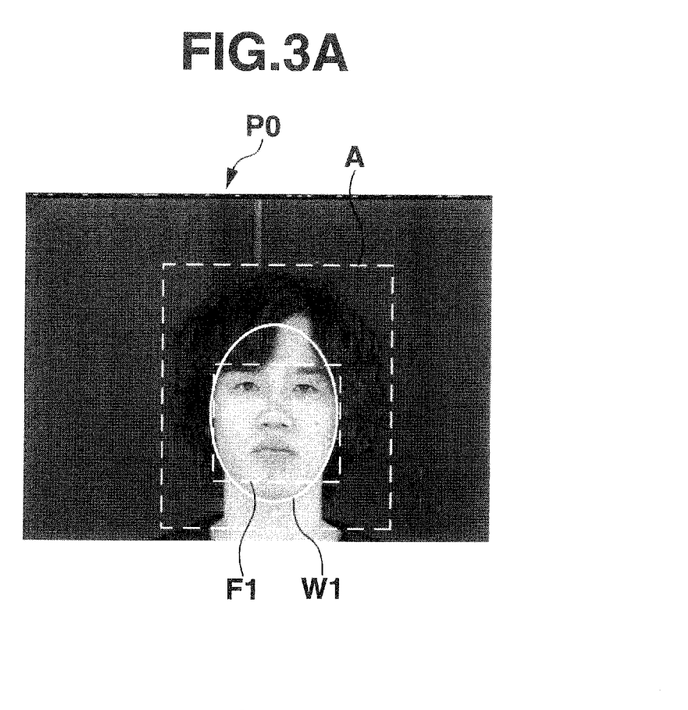
FIG. 3A is a view schematically showing an example of an image related to the hair style image creation processing of FIG. 2.
Figure 3B:
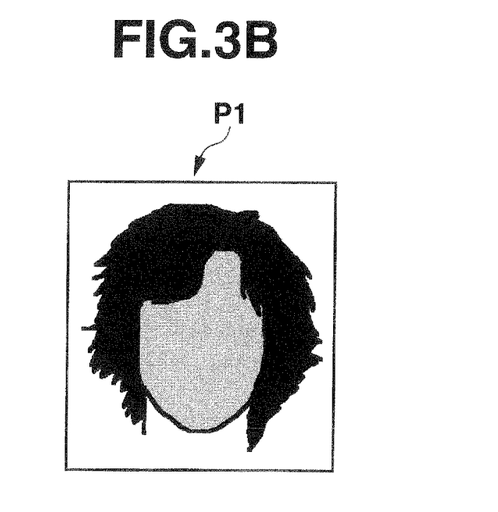
FIG. 3B is a view schematically showing an example of the image related to the hair style image creation processing of FIG. 2.

Moreover, the image recording unit (recording unit) 5 records a predetermined number of pieces of image data for hair style images P1 (refer to FIG. 3B).

For example, each piece of the image data for the hair style images P1 is an image schematically showing an outline of human hair, and is associated with a shape of an outline W1 (refer to FIG. 3A) as feature information of a face. That is to say, the image data of each hair style image P1 is formed by deleting a portion, which is in an inside of the outline W1 of a face jaw, from an inside of a face region F1 (refer to FIG. 3A) detected by face detection processing (to be described later).

Note that, with regard to the image data of the hair style image P1, for example, there is mentioned a method of forming the image data concerned in such a manner that processing (described later) using an active appearance model (AAM) is performed for the face region F1 to thereby delete face components (for example, eyes, nose, mouth, eyebrows and the like) present in the inside of such a facial contour W1, thereafter, lines are rendered along the facial contour W1 and tip end portions of the hair, and a skin portion in the inside of the facial contour W1 and the hair are painted over. Moreover, the rendering of the lines along the facial contour W1 and the tip end portions of the hair may be performed manually based on predetermined operations for the operation input unit 9 by a user, or may be performed automatically under control of a CPU of the central control unit 10.

Moreover, as a shape of the facial contour W1, for example, an ellipsoid, in which lengths of a major axis and a minor axis are specified, is mentioned. For example, by processing using the AAM, an ellipsoid that coincides with such a jaw outline W1 of each face is specified. Note that, though the shape of the jaw outline W1 of the face is illustrated as the feature information of the face, this is merely an example, and the feature information of the face is changeable arbitrarily as appropriate.

Note that, for example, the image recording unit 5 may be composed so that a recording medium (not shown) can be free attachable/detachable thereto/therefrom, and may be configured to control readout of data from the recording medium attached thereonto and write of data to the recording medium.

The image processing unit 6 includes an image acquiring section 6a, a face detecting section 6b, a component image creation section 6c, a feature information extraction section 6d, a hair style image specifying section 6e, and a portrait image creation section 6f.

Note that the respective sections of the image processing unit 6 are composed of predetermined logic circuits; however, such a configuration concerned is merely an example, and the respective units of the image processing unit 6 are not limited to this.

The image acquiring section 6a acquires an image serving as a processing target of portrait image creation processing.

That is to say, as an acquiring unit, the image acquiring section 6a acquires image data of an original image (for example, a photograph image and the like) P2. Specifically, from the memory 4, the image acquiring section 6a acquires a copy of image data (YUV data) of the original image P2, which is created by the image data creation unit 3 by the image capturing of the subject, the image capturing being performed by the image capturing unit 1 and the image capturing control unit 2, or the image acquiring section 6a acquires a copy of image data (YUV data) of the original image P2, which is recorded in the image recording unit 5 (refer to FIG. 5A).

The face detecting section 6b detects a face region F2 (refer to FIG. 5A) from the original image P2 serving s the processing target.

Figure 5A:
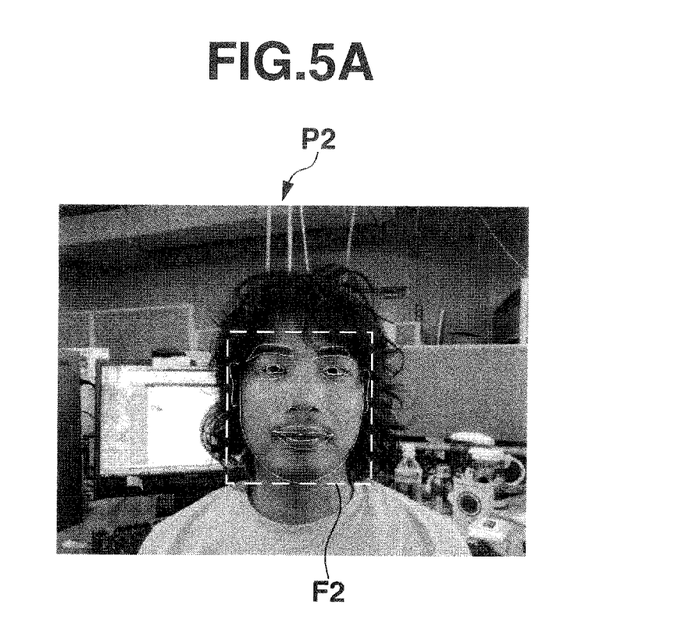
FIG. 5A is a view schematically showing an example of an image related to the portrait image creation processing of FIG. 4.

That is to say, as a face detecting unit, the face detecting section 6b detects the face region F2, in which the face is included, from the original, image P2 acquired by the image acquiring section 6a. Specifically, the face detecting section 6b acquires the image data of the original image P2, which is acquired as such a processing target image of the portrait image creation processing by the image acquiring section 6a, performs predetermined face detection processing for the image data concerned, and detects the face region F2.

Note that the face detection processing is a technology known in public, and accordingly, a detailed description thereof is omitted here.

The component image creation section 6c creates a face component image P4 (refer to FIG. 6B) showing main face components of the face.

That is to say, as a component creation unit, the component image creation section 6c creates the face component image P4 related to the main face components of the face included in the original image P2 (refer to FIG. 5A) acquired by the image acquiring section 6a. Specifically, the component image creation section 6c implements fine portion extraction processing for the face region F2 in which the face of the original image P2 is included, and for example, creates a facial fine portion image P3 (refer to FIG. 5B) in which the face components such as the eyes, the nose, the mouth, the eyebrows, the hair and the facial contour are shown by lines. For example, the component image creation section 6c creates the facial fine portion image P3 by processing using the AAM. Moreover, the component image creation section 6c implements the fine portion extraction processing for the face region F2 extracted from the image data of the original image P2 by the face detecting section 6b.

Figure 5B:
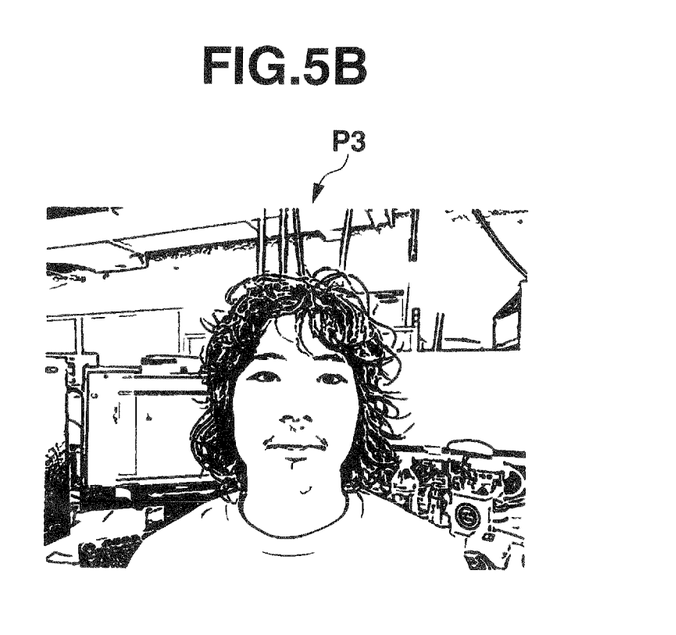
FIG. 5B is a view schematically showing an example of the image related to the portrait image creation processing of FIG. 4.

Here, the AAM is one of modeling methods for visual events, and models an arbitrary image of the face region F2. For example, in a predetermined registration unit, the component image creation section 6c registers in advance positions of predetermined feature regions (for example, outer corners of eyes, a nose tip, a face line and the like) and statistical analysis results of pixel values (for example, luminance values) in a plurality of sample face images. Then, while taking the above-described positions of the feature regions as references, the component image creation section 6c sets a shape model showing a shape of the face and a texture model showing "Appearance" in an average shape, and models the image of the face region F2 by using these models. In such a way, the component image creation section 6c creates the facial fine portion image P3 in which the main components in the original image P2 are extracted and shown by lines.

Moreover, the component image creation section 6c specifies a facial contour W2 (refer to FIG. 6A) in the face region F2 by the fine portion extraction processing, and creates a face component image P4 in which the face components present in the inside of the facial contour W2 and the face components in contact with the outline W2 concerned are shown by lines.

Specifically, the component image creation section 6c specifies pixels in contact with the facial contour W2 in the inside of the facial fine portion image P3, and deletes pixel aggregates G . . . (refer to FIG. 6A), which are present on the outside of the facial contour W2, among pixels continuous with the pixels concerned. That is to say, the component image creation section 6c deletes portions, which are present on the outside of the facial contour W2, in the facial fine portion image P3, and in addition, leave portions (for example, a left eyebrow in FIG. 6A when viewed from front) present in the inside of the facial contour W2 and in contact with the outline W2 concerned in the facial fine portion image P3 concerned. In such a way, the component image creation section 6c creates the face component image P4, for example, including partial images M of the main face components such as the eyes, the nose, the mouth, and the eyebrows (refer to FIG. 6B). Note that, in FIG. 6A, the facial contour W2 is schematically shown by a broken line.

Here, the component image creation section 6c may acquire information related to relative positional relationships of the partial images M of the respective face components on an XY plane space, and information related to coordinate positions thereof.

Note that, though the processing using the AAM is illustrated as the fine portion extraction processing, this is merely an example, and the fine portion extraction processing is not limited to this, and is changeable arbitrarily as appropriate.

For example, as the fine portion extraction processing, edge extraction processing or anisotropic diffusion processing may be performed, whereby the face component image P4 including the partial images M of the face components may be created. Specifically, for example, the component image creation section 6c may perform a differential operation for the image data (YUV data) of the original image P2 by using a predetermined differential filter (for example, a high-pass filter and the like), and may perform the edge detection processing for detecting spots, in which there are steep changes in a luminance value, a color and a density, as edges. Alternatively, for example, the component image creation section 6c may perform the anisotropic diffusion processing for smoothing the image data of the original image P2 by differentiating weight thereof between a tangential direction of a linear edge and a vertical direction of the edge by using a predetermined anisotropic diffusion filter.

The feature information extraction section 6d extracts the feature information from the face region F2 of the original image P2.

That is to say, as an extraction unit, the feature information extraction section 6d extracts, for example, the feature information of the shape of facial contour W2, and the like. Specifically, based on the image data (YUV data) of the original image P2, the feature information extraction section 6d performs feature extraction processing for selecting and extracting block regions (feature points) with high features in the face region F2. For example, the feature information extraction section 6d performs the feature extraction processing for pixels, which compose the outline W2 of the face specified in the face region F2 by the processing using the AAM, as the fine portion extraction processing, and then extracts the shape of such a facial contour W2 as the feature information. Here, as the shape of the facial contour W2, for example, an ellipsoid, in which lengths of a major axis and a minor axis are specified, and particularly, an ellipsoid that coincides with the jaw outline W2 of each face is mentioned.

Note that, though the shape of the facial contour is illustrated as the feature information to be extracted in the feature extraction processing, this is merely an example, and the feature information is not limited to this, and is changeable arbitrarily as appropriate as long as being comparable between the original image P2 and the hair style image P1. For example, in the original image P2 and the hair style image P1, feature vectors of the facial contour may be extracted and used, or a shape of the hair style may be used. Moreover, since the feature extraction processing is a technology known in public, a detailed description thereof is omitted here.

The hair style image specifying section 6e specifies the hair style image P1 corresponding to the feature information extracted by the feature information extraction section 6d.

That is to say, as a specifying unit, the hair style image specifying section 6e specifies the hair style image P1, which corresponds to the feature information extracted by the feature information extraction section 6d, based on the feature information of the face, which is recorded in the image recording unit 5. Specifically, the hair style image specifying section 6e compares ellipsoids, which define shapes of the outlines of a predetermined number of faces, the ellipsoids being recorded in the image recording unit 5, and the ellipsoid, which defines the shape of the facial contour W2 extracted by the feature information extraction section 6d, with each other, and then specifies an ellipsoid in which a coincidence degree is higher than a predetermined value. Then, the hair style image specifying section 6e specifies image data of the hair style image P1, which is associated with the specified ellipsoid.

Note that the hair style image specifying section 6e may specify a plurality of the ellipsoids in which the coincidence degrees are higher than the predetermined value, and may specify an ellipsoid, which is desired by the user and selected based on a predetermined operation for the operation input unit 9 by the user, from among the plurality of ellipsoids.

The portrait image creation section 6f creates a portrait image P5 by using the hair style image P1 and the face component image P4.

That is to say, as an image creation unit, the portrait image creation section 6f creates the portrait image P5 by using the image data of the hair style image P1 specified by the hair style image specifying section 6e and the partial images M of the face component image P4 created by the component image creation section 6c. Specifically, in the inside of the facial contour W1 of the hair style image P1, the portrait image creation section 6f specifies positions on which the partial images M of the respective face components, for example, such as the eyes, the nose, the mouth and the eyebrows are to be superimposed, superimposes the partial images M of the respective face components on the positions concerned, and creates the image data of the portrait image P5, which shows the original image P2 by a portrait. (refer to FIG. 6C). At this time, the portrait image creation section 6f may modify the hair style image P1 so that the ellipsoid that defines the outline W1 of the face concerned can coincide with the ellipsoid that defines the facial contour W2 of the original image P2.

Moreover, the portrait image creation section 6f may create an image in which predetermined portions (for example, the face components such as the eyes, the mouth and the eyebrows, and the like) of the portrait image P5 are shown while being colored by predetermined colors.

The display control unit 7 performs control to read out the image data for use of display, which is temporarily stored in the memory 4, and to allow the display unit 8 to display the image data concerned thereon.

Specifically, the display control unit 7 includes a video random access memory (VRAM), a VRAM controller, a digital video encoder, and the like. Then, the digital video encoder periodically reads out the luminance signals Y and the color-difference signals Cb and Cr, which are read out from the memory 4 and stored in the VRAM (not shown) under the control of the central, control unit 10, through the VRAM controller from the VRAM, creates video signals based on these data, and outputs the created video signals to the display unit 8.

For example, the display unit 8 is a liquid crystal display panel. One display screen, the display unit 8 displays the image, which is captured by the image capturing unit 1, and the like based on the video signals from the display control unit 7. Specifically, the display unit 8 displays a live view image while sequentially updating a plurality of the frame images at a predetermined frame rate. Here, the frame images are created by the image capturing of the subject by the image capturing unit 1 and the image capturing control unit 2 in a still image capturing mode or a moving picture capturing mode. Moreover, the display unit 8 displays an image (rec view image) to be recorded as a still image, or displays an image that is being recorded as a moving picture.

The operation input unit 9 is a section for performing predetermined operations of the image capturing device 100 concerned. Specifically, the operation input unit 9 includes a shutter button (not shown) related to an instruction for image capturing of the subject, a selection deciding button (not shown) related to instructions for selecting the image capturing mode, functions and the like, a zoom button (not shown) related to an instruction of adjusting a zoom amount, and the like, and outputs predetermined operation signals to the central control unit 10 in response, to operations for the respective buttons of the operation units concerned.

The central control unit 10 is a section that controls the respective sections of the image capturing device 100. Specifically, though not shown, the central control unit 10 includes a central processing unit (CPU) and the like, and performs a variety of control operations in accordance with a variety of processing programs (not shown) for the image capturing device 100.

Figure 2:
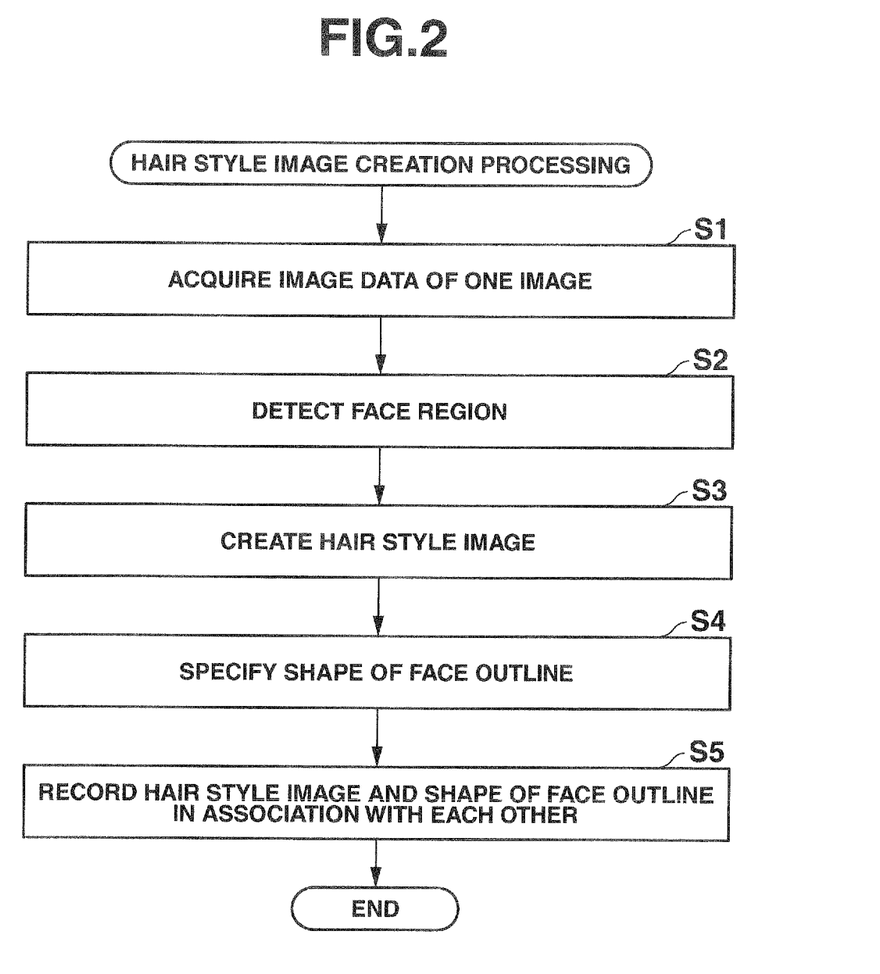
FIG. 2 is a flowchart showing an example of operations related to hair style image creation processing by the image capturing device of FIG. 1.

Next, with reference to FIG. 2 and FIG. 3, a description is made of the hair style image creation processing by the image capturing device 100.

FIG. 2 is a flowchart showing an example of operations related to the hair style image creation processing.

The hair style image creation processing is processing to be executed by the respective units of the image capturing device 100 concerned, and in particular, by the image processing unit 6 under the control of the central control unit 10 in the case where a hair style image creation mode is selected and designated from among a plurality of operation modes, which are displayed on a menu screen, based on a predetermined operation for the selection deciding button of the operation input unit 9 by the user.

Moreover, it is assumed that image data of an image P0 serving as a processing target of the hair style image creation processing is recorded in the image recording unit 5.

As shown in FIG. 2, first, the image recording unit 5 reads out image data (YUV data) of the one image P0 (refer to FIG. 3A) designated from among the image data, which are recorded in the image recording unit 5, based on the predetermined operation for the operation input unit 9 by the user, and the image acquiring section 6a of the image processing unit 6 acquires the image data, which is thus read out, as the processing target of the hair style image creation processing concerned (Step S1).

Next, the face detecting section 6b performs the predetermined face detection processing for the image data of the one image P0 acquired as the processing target by the image acquiring section 6a, and detects the face region F1 (Step S2).

Subsequently, the image processing unit 6 performs the processing, which uses the AAM, for the detected face region F1, and creates the image data of the hair style image P1 (refer to FIG. 3B) (Step S3). Specifically, the image processing unit 6 cuts out a region A (refer to FIG. 3A) with a predetermined size, which surrounds the face region F1. Then, the image processing unit 6 deletes the eyes, the nose, the mouth, the eyebrows and the like, which are present in the inside of the facial contour W1 of the face region F1, and thereafter, renders the line along the facial contour W1 and paints over the skin portion in the inside of the facial contour W1 by a predetermined color (for example, a flesh color and the like), and in addition, renders the lines along the tip end portions of the hair and paints over the hair by a predetermined color. In such a way, the image processing unit 6 creates the image data of the hair style image P1 (refer to FIG. 3B).

Next, the image processing unit 6 specifies the ellipsoid that defines the shape of the facial contour W1 specified by the processing using the AAM, and extracts the specified ellipsoid as the feature information (Step S4). Thereafter, the image recording unit 5 records the created image data of the hair style image P1 and the shape (feature information) of the outline W1 in association with each other (Step S5), and ends the hair style image creation processing.

The above-described hair style image creation processing is executed for each of the image data of the images serving as the processing targets, and a state is brought where the image data of a predetermined number of the hair style images P1 are recorded in the image recording unit 5.

Figure 4:
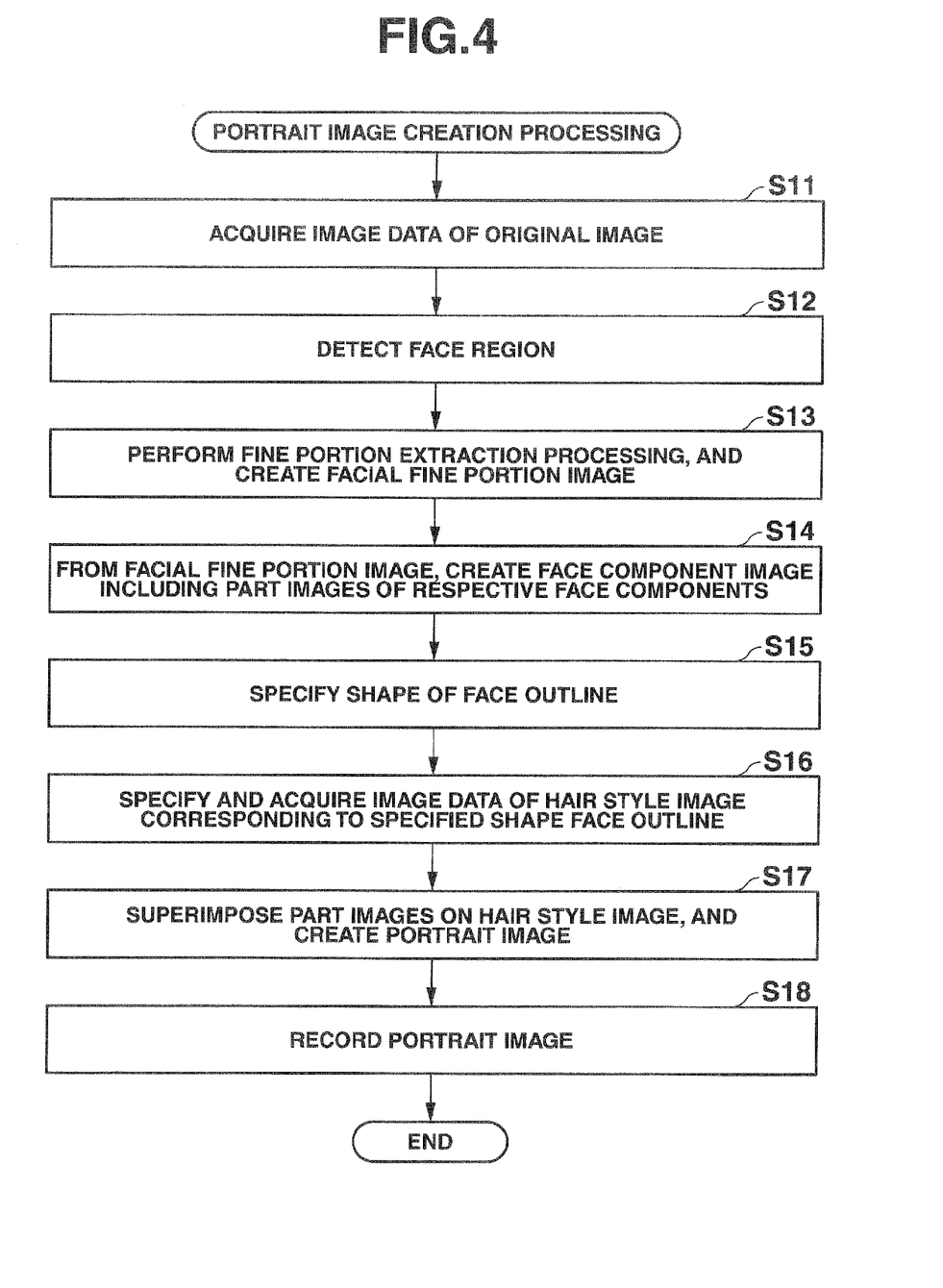
FIG. 4 is a flowchart, showing an example of operations related to portrait image creation processing by the image capturing device of FIG. 1.
Figure 6A:
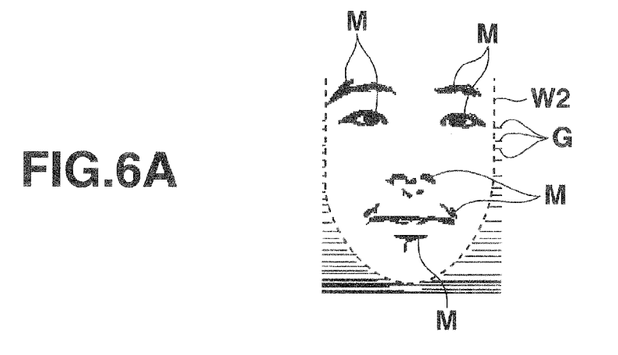
FIG. 6A is a view schematically showing an example of the image related to the portrait image creation processing of FIG. 4.
Figure 6B:
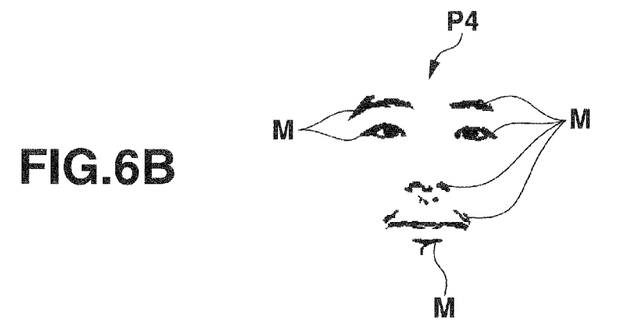
FIG. 6B is a view schematically showing an example of the image related to the portrait image creation processing of FIG. 4.
Figure 6C:
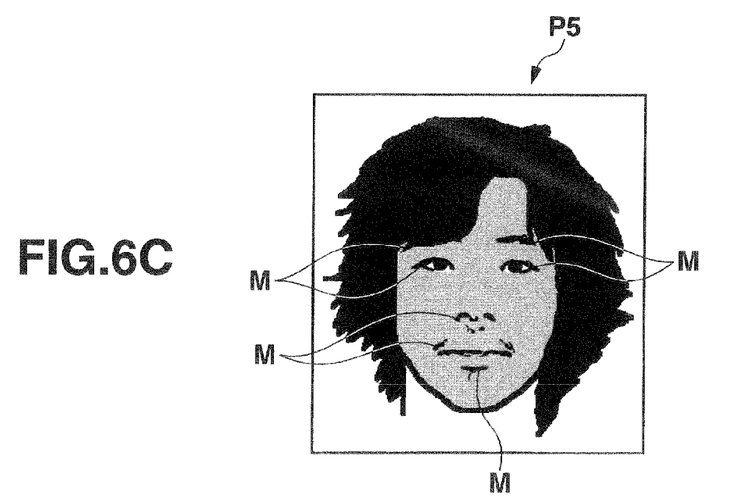
FIG. 6C is a view schematically showing an example of the image related to the portrait image creation processing of FIG. 4.

Next, with reference to FIG. 4 to FIG. 6, a description is made of the portrait image creation processing by the image capturing device 100.

FIG. 4 is a flowchart showing an example of operations related to the portrait image creation processing.

The portrait image creation processing is processing to be executed by the respective units of the image capturing device 100 concerned, and in particular, by the image processing unit 6 under the control of the central control unit 10 in the case where a portrait image creation mode is selected and designated from among the plurality of operation modes, which are displayed on the menu screen, based on a predetermined operation for the selection, deciding button of the operation input unit 9 by the user.

Moreover, it is assumed that the image data of the original image P2 serving as the processing target of the portrait image creation processing is recorded in the image recording unit 5.

As shown in FIG. 4, first, the image recording unit 5 reads out the image data of the original image P2 (refer to FIG. 5A) designated from among the image data, which are recorded in the image recording unit 5, based on the predetermined operation for the operation input unit 9 by the user, and the image acquiring section 6a of the image processing unit 6 acquires the image data, which is thus read out, as the processing target of the portrait image creation processing concerned (Step S11).

Next, the face detecting section 6b performs the predetermined face detection processing for the image data of the original image P2 acquired as the processing target by the image acquiring section 6a, and detects the face region F2 (Step S12).

Subsequently, the component image creation section 6c performs the fine portion extraction processing (for example, the processing using the AAM, and the like) for the detected face region F2, and creates the facial fine portion image P3 (refer to FIG. 5B) in which the face components such as the eyes, the nose, the mouth, the eyebrows, the hair and the facial contour in the face region F2 in the original image P2 are shown by lines (Step S13). Then, the component image creation section 6c specifies the facial contour W2 in the face region F2 by the fine portion extraction processing, and creates the face component image P4 that includes the face components present in the inside of the facial contour W2 and the face components in contact with the outline W2 concerned, that is, the face component image P4, for example, including the partial images M of the main face components such as the eyes, the nose, the mouth and the eyebrow (Step S14; refer to FIG. 6B).

Subsequently, the feature information extraction section 6d performs the feature extraction processing for the pixels, which compose the outline W2 of the face specified in the face region F2 by the fine portion extraction processing, specifies the ellipsoid that defines the shape of such a facial contour W2, and extracts the specified ellipsoid as the feature information (Step S15).

Next, the hair style age specifying section 6e compares the ellipsoids, which define the shape of the outlines W1 of the predetermined number of faces, the ellipsoids being recorded in the image recording unit 5, and the ellipsoid, which defines the shape of the facial contour W2 extracted by the feature information extraction section 6d, with each other. Then, the hair style image specifying section 6e specifies the ellipsoid in which the coincidence degree is higher than the predetermined value, specifies the image data of the hair style image P1, which is associated with the specified ellipsoid, and reads out and acquires the specified image data from the image recording unit 5 (Step S16).

Thereafter, in the inside of the facial contour W1 of the hair style image P1, which is specified by the hair style image specifying section 6e, the portrait image creation section 6f specifies the positions on which the partial images M of the respective face components, for example, such as the eyes, the nose, the mouth and the eyebrows in the face component image P4 created by the component image creation section 6c are to be superimposed. Then, the portrait image creation section 6f superimposes the partial images M of the respective face components on the positions concerned, and, creates the image data of the portrait image P5, which shows the original image P2 by the portrait (Step S17; refer to FIG. 6C).

Then, the image recording unit 5 acquires and records the image data (YUV data) of the portrait image P5, which is created by the portrait image creation section 6f (Step S18).

In such a way, the portrait image creation processing is ended.

As described above, in accordance with the image capturing device 100 of this embodiment, the face component image P4 related to the main, face components of the face in the original image P2 is created, the hair style image P1 corresponding to the feature information extracted from, the face in the original image P2 is specified based on the feature information (for example, the shape of the facial contour W1, and the like) of the face, which is recorded in the image recording unit 5, and the portrait image P5 is created by using the specified hair style image P1 and the face component image P4. Accordingly, the face component image P4 related to the main face components of the face is created separately from the hair style image P1, and the hair style image P1 corresponding to the feature information of the face, which is related to the face component image P4, is used, whereby the portrait image P5 with more plentiful expressions, which expresses the face components characteristically, can be created with ease.

That is to say, if the portrait is described by lines of only outline shapes of the characteristic configurations of the face, the portrait becomes a portrait poor in reality, and meanwhile, if the portrait is described by lines to the extent of fine structures of the face, then it is apprehended that such a problem occurs that the touch and texture of the portrait becomes too fine, resulting in a decrease of unique quality of the portrait. Accordingly, the face component image P4 related to the main face components of the face is created, and the portrait image P5 is created by using the hair style image P1 specified in the image recording unit 5, whereby the image with more plentiful expressions, which express the characteristic face components, for example, such as the eyes, the nose, the mouth and the eyebrows at least characteristically, can be created with ease.

Moreover, the fine portion extraction processing is implemented for the face region F2 in which the face of the original image included, and the face component image P4 in which the face components are shown by lines is created, and accordingly, the face component image P4 that characteristically expresses the fine structures of the face components can be created.

In particular, the facial contour W2 in the face region F2 is specified by the fine portion extraction processing, and the face component image P4 is created, in which the face components present in the inside of the facial contour W2 and the face components in contact with the outline W2 concerned. Accordingly, the creation of the face component image P4 can be performed as appropriate. Specifically, the facial fine portion image P3 in which the face components are shown by lines is created by the fine portion extraction processing, and the portions in the facial fine portion image P3, which are present on the outside of the facial contour W2, are deleted, and in addition, the portions, which are present in the inside of the facial contour W2 and are in contact with the outline W2 concerned, are left. In such a way, the face component image P4 in which the face components present in the inside of the facial contour W2 and the face components in contact with the outline W2 concerned are shown by lines, that is, the face component image P4 that characteristically expresses the fine structures of the face components can be created as appropriate.

Moreover, the face region F2 is detected by the face detecting section 6b, whereby the face components present in the face region F2 concerned can be specified with ease, and the face component image P4 in which the face components concerned are shown by lines can be created with more ease.

Furthermore, the face region F2 is detected by the face detecting section 6b, whereby the feature information from the face region F2 concerned can be extracted with ease.

Note that the present invention is not limited to the above-described embodiment, and may be improved and changed in design in various ways within the scope without departing from the spirit of the present invention.

For example, in the above-described embodiment, the feature information (the shape of the facial contour W2, and the like) is extracted after the face component image P4 is created; however, an order of these pieces of the processing is merely an example, and such a processing order is not limited to this. The processing order may be inverted, that is to say, the creation processing of the face component image P4 may be performed after the extraction processing of the feature information.

Moreover, the hair style image P1 and the face component image P4 are created from the face regions F1 and F2 detected by the face detecting section 6b; however, whether or not to include the face detecting section 6b that implements the face detection processing is changeable arbitrarily as appropriate.

Furthermore, it is not necessary that the images serving as the creation sources of the hair style image P1 and the face component image P4 be the images P0 and P2 showing a frontal face, and for example, in the case of an image in which a face is tilted so as to face diagonally, an image in which the face concerned is deformed so as to face forward may be created, and may be used as the creation source.

Moreover, such a configuration in which the hair style image P1 is recorded in the image recording unit 5 is adopted; however, a source of the hair style image P1 is not limited to this, and a configuration may be adopted, in which the hair style image P1 is recoded in a predetermined server connected to a network, and the image acquiring section 6a acquires the hair style image P1 from the predetermined server through the network.

Figure 7A:
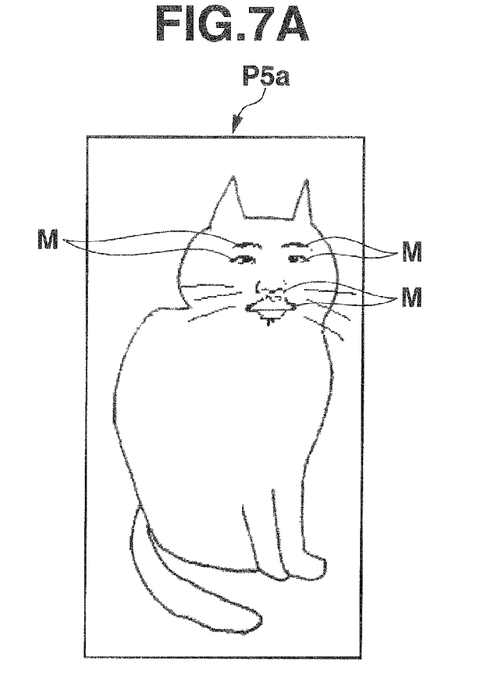
FIG. 7A is a view schematically showing an example of an image related to a modification example of the portrait image creation processing.
Figure 7B:
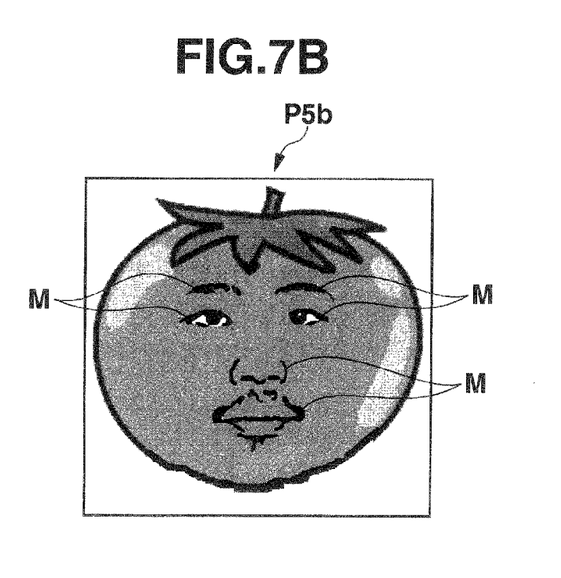
FIG. 7B is a view schematically showing an example of the image related to a modification example of the portrait image creation processing.

Moreover, in the above-described embodiment, the partial images M of the respective face components such as the eyes, the nose, the mouth and the eyebrows are superimposed on the hair style image P1, whereby the portrait image P5 is created; however, such a configuration is merely an example, and a way of creating the portrait image is not limited to this. For example, an animal (for example, a cat and the like) and food (for example, a tomato and the like), which are other than human, may be used as base images of the portrait image P5, and portrait images P5a and P5b (refer to FIG. 7A and FIG. 7B), in which the partial images M of the respective face components are superimposed thereon, may be created. Note that, as the feature information, for example, a shape of an outline of a face portion of the cat may be used in the case of using the cat as the base image, and moreover, an outer shape of the tomato may be used in the case of using the tomato as the base image.

Furthermore, the configuration of the image capturing device 100, which is illustrated in the above-described embodiment, is merely an example, and the configuration of the capturing device 100 according to the present invention is not limited to this. Any configuration may be adopted as long as it is possible to execute the image processing according to the present invention.

In addition, in the above-described embodiment, a configuration is adopted, in which functions as the acquiring unit, the component creating unit, the extracting unit, the specifying unit and the image creating unit are realized in such a manner that the image acquiring section 6a, the component image creation section 6c, the feature information extraction section 6d, the hair style image specifying section 6e and the portrait image creation section 6f are driven under the control of the central control unit 10; however, such a configuration according to the present invention is not limited to this. A configuration in which a predetermined program and the like are executed by the central control unit 10 may be adopted.

That is to say, in a program memory (not shown) that stores programs therein, a program is stored, which includes an acquiring processing routine, a component creation processing routine, an extraction processing routine, a specifying processing routine, and an image creation processing routine. Then, by the acquiring processing routine, the CPU of the central control unit 10 may be allowed to function as the unit for acquiring the image. Moreover, by the component creation processing routine, the CPU of the central control unit 10 may be allowed to function as the unit for creating the face component P4 related to the main components of the face included in the acquired image. Moreover, by the extraction processing routine, the CPU of the central control unit 10 may be allowed to function as the unit for extracting the feature information from the face included in the acquired image. Moreover, by the specifying processing routine, the CPU of the central control unit 10 may be allowed to function as the unit for specifying the hair style image P1, which corresponds to the extracted feature information, based on the feature information of the face, which is recorded in the image recording unit 5. Furthermore, by the image creation processing routine, the CPU of the central control unit 10 may be allowed to function as the unit for creating the portrait image P5 by using the specified hair style image P1 and the created face component image P4.

In a similar way, such a configuration may be adopted, in which the face detecting unit is also realized in such a manner that a predetermined program and the like are executed by the CPU of the central control unit 10.

Moreover, transitory computer-readable mediums which store therein the programs for executing the above-described respective pieces of processing, it is also possible to apply a non-volatile memory such as a flash memory, and a portable recording medium such as a CD-ROM as well as a ROM, a hard disk and the like. Moreover, as a medium that provides data of the programs through a predetermined communication line, a carrier wave is also applied.

Some of the embodiments of the present invention have been described; however, the scope of the present invention is not limited to the above-mentioned embodiments, and incorporates the scope of the invention, which is described in the scope of claims, and incorporates equilibrium ranges thereof.

The entire disclosure of Japanese Patent Application No. 2012-068924 filed on Mar. 26, 2012 including description, claims, drawings, and abstract are incorporated herein by reference in its entirety.

Although various exemplary embodiments have been shown and described, the invention is not, limited to the embodiments shown. Therefore, the scope of the invention is intended to be limited solely by the scope of the claims that follow.

What is claimed is:

1. An image creating device comprising:
a CPU which functions as:
an acquiring unit that acquires a photographic image;
a component creation unit that creates a face component image, the face component image being created using components of a face included in the photographic image acquired by the acquiring unit, and the face component image being an image shown by lines, wherein the component creation unit deletes portions present outside of a facial contour and leaves portions present inside of the facial contour to thereby create the face component image;
an extraction unit that extracts feature information of a shape of an outline of the face included in the photographic image acquired by the acquiring unit;
a specifying unit that (i) performs a comparison of the feature information of the shape of the outline of the face in the photographic image acquired by the acquiring unit with a plurality of items of candidate feature information describing shapes of outlines of faces which are shown by lines and are recorded in a recording section, and (ii) specifies a hair style image corresponding to one of the plurality of items of candidate feature information which matches the feature information of the shape of the outline of the face image extracted by the extraction unit based on a result of the comparison, the hair style image being an outline image of human hair; and
an image creation unit that creates an image shown by lines by combining the hair style image specified by the specifying unit and the face component image created by the component creation unit.

2. The image creating device according to claim 1, wherein the component creation unit further implements fine portion extraction processing for a face region of the photographic image acquired by the acquiring unit, and creates the face component image in which the components of the face are shown by lines.

3. The image creating device according to claim 2, wherein the component creation unit further specifies, as the shape of the outline of the face, the facial contour in the face region by the fine portion extraction processing.

4. The image creating device according to claim 1, wherein the feature information of the shape of the outline of the face includes a shape of the facial contour of the face.

5. The image creating device according to claim 1, further comprising:
a face detecting unit that detects a face region from the photographic image acquired by the acquiring unit,
wherein the component creation unit creates the face component image in which the components of the face present in the face region detected by the face detecting unit are shown by lines, and the extraction unit extracts the feature information from the face region detected by the face detecting unit.

6. An image creating method for an image creating device comprising a recording section and a CPU, the image creating method being executed by the CPU and comprising:
acquiring a photographic image captured by an image capturing unit;
creating a face component image using components of a face included in the acquired photographic image, the face component image being an image shown by lines, and the component creation unit deleting portions present outside of a facial contour and leaving portions present inside of the facial contour to thereby create the face component image;

extracting feature information of a shape of an outline of the face included in the acquired photographic image;

performing a comparison of the feature information of the shape of the outline of the face in the acquired photographic image with a plurality of items of candidate feature information describing shapes of outlines of faces which are shown by lines and are recorded in a recording section, and specifying a hair style image corresponding to one of the plurality of items of candidate feature information which matches the extracted feature information of the shape of the outline of the face image based on a result of the comparison, the hair style image being an outline image of human hair; and creating an image shown by lines by combining the specified hair style image and the created face component image.

7. The image creating method according to claim 6, wherein creating the face component image comprises implementing fine portion extraction processing for a face region of the acquired photographic image, and creating the face component image in which the components of the face are shown by lines.

8. The image creating method according to claim 7, wherein creating the face component image comprises specifying, as the shape of the outline of the face, the facial contour in the face region by implementing the fine portion extraction processing.

9. The image creating method according to claim 6, wherein the feature information of the shape of the outline of the face includes a shape of the facial contour of the face.

10. The image creating method according to claim 6, further comprising:

detecting a face region from the acquired photographic image, wherein in the created face component image, the components of the face present in the detected face region are shown by lines, and the extracted feature information is extracted from the detected face region.

11. A non-transitory computer-readable recording medium having a program recorded thereon which is executable to control a computer of an image forming device to function as:

an acquiring unit that acquires a photographic image;

a component creation unit that creates a face component image, the face component image being created using components of a face included in the photographic image acquired by the acquiring unit, the face component image being an image shown by lines, wherein the component creation unit deletes portions present outside of a facial contour and leaves portions present inside of the facial contour to thereby create the face component image;

an extraction unit that extracts feature information of a shape of an outline of the face included in the photographic image acquired by the acquiring unit;

a specifying unit that (i) performs a comparison of the feature information of the shape of the outline of the face in the photographic image acquired by the acquiring unit with a plurality of items of candidate feature information describing shapes of outlines of faces which are shown by lines and are recorded in a recording section, and (ii) specifies a hair style image corresponding to one of the plurality of items of candidate feature information which matches the feature information of the shape of the outline of the face image extracted by the extraction unit based on a result of the comparison, the hair style image being an outline image of human hair; and an image creation unit that creates an image shown by lines by combining the hair style image specified by the specifying unit and the face component image created by the component creation unit.

12. The image creating device according to claim 1, wherein the outline of the facial contour is not included in the face component image.

13. The image creating device according to claim 12, wherein the portions present inside of the facial contour, which portions are left when the component creation unit creates the face component image, include portions that are in contact with an outline of the facial contour.

* * * * *